US008420253B2

(12) United States Patent
Kim (10) Patent No.: US 8,420,253 B2
(45) Date of Patent: Apr. 16, 2013

(54) SECONDARY BATTERY

(75) Inventor: Heongsin Kim, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 1070 days.

(21) Appl. No.: 12/003,847

(22) Filed: Jan. 2, 2008

(65) Prior Publication Data

US 2008/0160398 A1   Jul. 3, 2008

(30) Foreign Application Priority Data

Jan. 3, 2007 (KR) .................. 10-2007-0000618

(51) Int. Cl.
*H01M 2/04* (2006.01)
*H01M 10/02* (2006.01)
*H01M 10/04* (2006.01)
*H01M 10/05* (2010.01)

(52) U.S. Cl.
USPC .......................................... 429/163; 429/175

(58) Field of Classification Search .............. 429/7–8, 429/121, 163–187
See application file for complete search history.

(56) References Cited

U.S. PATENT DOCUMENTS

| 4,221,854 A * | 9/1980 | Hammar et al. ............. 429/234 |
| 6,225,778 B1 * | 5/2001 | Hayama et al. ............. 320/112 |
| 2001/0026888 A1 * | 10/2001 | Yokoyama et al. .......... 429/121 |
| 2003/0077486 A1 * | 4/2003 | Iwaizono et al. ............. 429/7 |
| 2004/0251872 A1 * | 12/2004 | Wang et al. ................. 320/112 |
| 2005/0112415 A1 * | 5/2005 | Takeshita et al. ............ 429/7 |
| 2005/0164080 A1 * | 7/2005 | Kozu et al. .................. 429/176 |
| 2006/0127756 A1 * | 6/2006 | Seo ............................. 429/175 |
| 2006/0251931 A1 * | 11/2006 | Kim ............................. 429/7 |
| 2010/0143793 A1 * | 6/2010 | Yamamoto .................. 429/175 |

FOREIGN PATENT DOCUMENTS

| JP | 2006-147329 | 6/2006 |
| JP | 2006-331818 | 12/2006 |

OTHER PUBLICATIONS

Machine Translation of JP 2006-147329.*
Machine Translation of JP 2006-331818.*

* cited by examiner

*Primary Examiner* — Jonathan Crepeau
*Assistant Examiner* — Jacob Buchanan
(74) *Attorney, Agent, or Firm* — Robert E. Bushnell, Esq.

(57) ABSTRACT

A secondary battery, sheathes a protection circuit board with a separate cover, connects the sheathed protection circuit board to a bare cell, and executes a molding or hard pack operation with a molding resin member in a space between the protection circuit board and the bare cell. The secondary battery may be constructed with a rechargeable bare cell, a protection circuit board supporting a protection circuit electrically connected to the bare cell and an external terminal, a board exterior cover adhering to the protection circuit board and the board exterior cover exposing the external terminal, and a first lead plate and a second lead plate that electrically connect the bare cell to the protection circuit board.

18 Claims, 5 Drawing Sheets

FIG. 8

SECONDARY BATTERY

CLAIM OF PRIORITY

This application makes reference to, incorporates the same herein, and claims all benefits accruing under 35 U.S.C. §119 from an application for SECONDARY BATTERY earlier filed in the Korean Intellectual Property Office on 3 Jan. 2007 and there duly assigned Serial No. 10-2007-0000618.

BACKGROUND OF THE INVENTION

1. Field of the Invention

The present invention relates to a secondary battery, and more particularly, to a secondary battery that sheathes a protection circuit board with a separate cover in advance and connects the sheathed protection circuit board to a bare cell and then executes a molding or hard pack operation with a molding resin member in a space between the protection circuit board and the bare cell.

2. Description of the Related Art

Generally, a secondary battery, which is contrary to a primary battery, denotes the battery capable of recharging and discharging and the secondary battery is widely used in compact hi-tech electronic apparatuses such as cellular phones, PDAs and notebook computers. Particularly, a lithium secondary battery has an operating voltage of 3.6V which is three times as much as that of a conventional nickel-cadmium battery or nickel-metal hydride battery, and a relatively higher energy density per unit weight, thus the market demand for the lithium secondary battery dramatically increases.

According to the lithium secondary battery, a lithium based oxide is used as a positive electrode active material and a carbon material is used as a negative electrode active material. Also, the lithium secondary battery is manufactured in various shapes, for example cylinder, rectangular and pouch shape.

Further, a rectangular secondary battery is composed of a rechargeable bare cell formed in a rectangular shape and a protection circuit module when the constitution of the secondary battery is explained on the basis of the rectangular shape.

The bare cell may be constructed with an electrode assembly, a can in an approximate rectangular shape receiving the electrode assembly, and a cap assembly sealing the can by being connected to an opening of the can.

The protection circuit module is a safety device which prevents the battery from ignition and explosion by blocking a current when the internal temperature or the voltage of the battery increased. The protection circuit module is composed of a protection circuit board on which various electrical elements are mounted, and the protection circuit board is connected to the bare cell via a conductor so called a lead plate.

The form, in which the protection circuit board is connected to the bare cell, is referred to as a core pack. The secondary battery may be used in the form of the core pack, however, the secondary battery is generally used in the form that utilizes molding or a separate exterior case as a structure covering a space between the bare cell and the protection circuit board and the surface of the protection circuit board. Here, the battery type, in which the core pack is covered by the separate exterior case, is generally referred as a hard pack or hard pack battery, thus the terms (i.e. hard pack and hard pack battery) are used when necessary.

According to the secondary battery manufactured by molding the space between the bare cell and the protection circuit module with a molding resin member, however, the molding is executed even on the surface on which an external terminal is installed, and thus several problems are generated.

For example, the amount of the molding resin member is relatively high because the space between the bare cell and the protection circuit board to be molded is relatively broad. The space between the bare cell and the protection circuit board is bent several times and is extended to one surface of the external terminal, thus the operation of inserting the molding resin member into the space needs to be precisely executed. Such contemporary insertion of the molding resin member may deteriorate the productivity of the secondary batteries. Furthermore, there is a possibility that the molding resin member is improperly supplied to the space between the protection circuit board and the external terminal which extends and meanders. The difficulty of accurate application of the molding resin may cause a problem that one surface of the external terminal of the protection circuit board may be improperly covered, therefore, the external terminal may fail to be protected from external impacts. It is almost impossible to have one surface of the external terminal of the protection circuit board to be thickly molded by the molding resin member considering the entire thickness of the secondary battery, therefore the structural stability of the secondary battery is reduced because one surface of the external terminal of the protection circuit board is protected by a thin, low-strength resin layer.

In accordance with the secondary battery manufactured by covering the bare cell and the protection circuit module with a separate exterior case, the exterior case has to be formed to cover the outer part of the protection circuit board, and thus the amount of the material required for the exterior case is increased and the mold structure for the exterior case is getting complicated. Therefore, manufacturing costs may increase. Furthermore, the exterior case has to have a sufficient thickness, since the conventional exterior case accommodates the entire core pack or covers multiple surfaces of the core pack and the conventional exterior case is manufactured by a technique of injection molding. Therefore, it is almost impossible to mold moldings with a thin thickness, and the conventional exterior case can hardly have a sufficient thin thickness. This is also applied to a cover surface of the protection circuit board and serves as a reason to increase the over-all length of the secondary battery.

There is another problem that the manufacturing process of the secondary battery is complicated, because it is essential to check whether or not the external terminal is exposed to the outside of the exterior case while being packed.

SUMMARY OF THE INVENTION

It is, therefore, an object of the present invention to provide an improved secondary battery to overcome the problems in conventional secondary battery.

It is another object of the present invention to solve the problems mentioned above. An aspect of the present invention is to provide a secondary battery which facilitates the molding executed by a molding resin member between a rechargeable bare cell and a protection circuit board, or the pack operation executed by the exterior case as the protection circuit board is connected to the bare cell in a state that the protection circuit board is sheathed by a separate cover.

Another aspect of the present invention is to provide a secondary battery with an increased structural stability because one surface of the protection circuit board exposed to the exterior of the battery is protected with a degree of relatively higher strength.

Another aspect of the present invention is to provide a secondary battery having a stable structure, since the protection circuit board of the protection circuit module is not likely to be damaged by external factors when the bare cell and the protection circuit module are connected by the molding operation.

Another aspect of the present invention is to provide a secondary battery which enhances productivity of the battery, since the amount of the material required for the molding operation is reduced when the molding operation is executed by a molding resin member between the bare cell and the protection circuit module, and thus simplifying the injection of the molding resin member and the other processes.

Another aspect of the present invention is to provide a secondary battery which can reduce the battery manufacturing costs by decreasing the material of the exterior case used for the hard pack operation of the core pack, and reduce the over-all length of the hard pack battery by forming the cover against the protection circuit board of the core pack with a thin thickness.

For achieving the above-mentioned aspects, the secondary battery of the present invention comprises a rechargeable bare cell, a protection circuit board on which a protection circuit is formed against the bare cell and an external terminal is installed in one surface of the protection circuit board, a board exterior cover which covers exposed external terminal attached to one surface of the protection circuit board, a first lead plate and a second lead plate that connect positive electrode/negative electrode of the bare cell to the protection circuit board respectively.

The board exterior cover may be composed of a hard insulating cover body having a through hole to which the external terminal is exposed, and a bonding layer formed in one surface of the cover body. Here, the cover body may have the form of a plastic film manufactured by an extrusion molding, and the thickness of the plastic film ranges between 0.1 mm and 0.35 mm. The thickness of the bonding layer may range between 0.05 mm and 0.1 mm.

According to the board exterior cover, length of each side of the cross-section of board exterior cover may be identical to length of according side of one surface of the protection circuit board respectively.

A molding resin member may be formed in the space between the protection circuit board including the side surface of the protection circuit board and the bare cell by the molding resin member, and the molding resin member may be formed to cover a part of the side surface of the bare cell.

In the board exterior cover, at least one pair of cutout portions may be formed to be positioned opposite to each other. Two pairs of the cutout portions may be formed on the long edge of the board exterior cover. Also, the cutout portion may penetrate the board exterior cover in the thickness direction.

The secondary battery of the present invention having a bare cell, a protection circuit board, board exterior cover, a first lead plate and a second lead plate may further includes a first exterior case in which a fixed protrusion inserting into one cutout portion of the board exterior cover is formed and which covers a part of side surface of the bare cell, and a second exterior case in which a fixed protrusion inserting into another cutout portion of the board exterior cover and which covers the entire side surface, except for the region covered by the first exterior case.

The top end and fixed protrusions of the first and second exterior cases may have the same heights as one surface of the protection circuit board.

The first and second exterior cases may be configured to have a lower part case covering the bottom surface of the bare cell.

The first and second exterior cases may be configured to have lower part cases covering the bottom surface of the bare cell by connecting each other.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Hereinafter, the present invention will be described more specifically with reference to the accompanying drawings. In the following description of the present invention, like reference symbols indicate the same or similar components.

Figure 1:
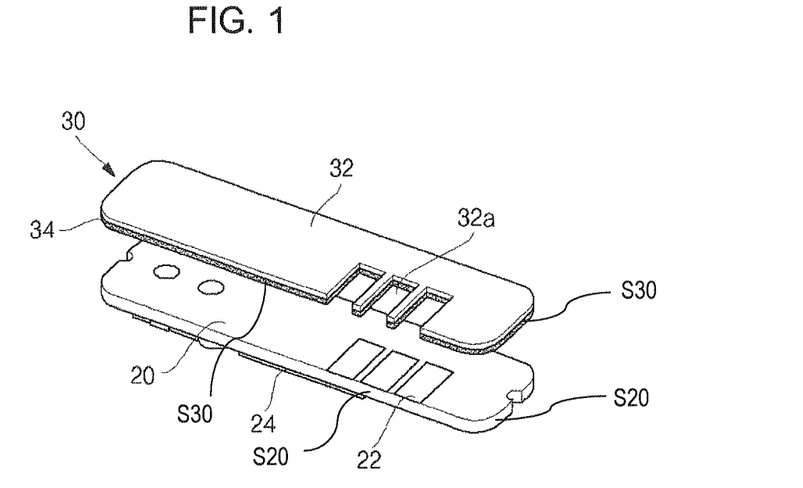
FIG. 1 is an exploded perspective view illustrating one exemplary embodiment of a protection circuit board and a board exterior cover of a secondary battery according to the present invention.
Figure 2:
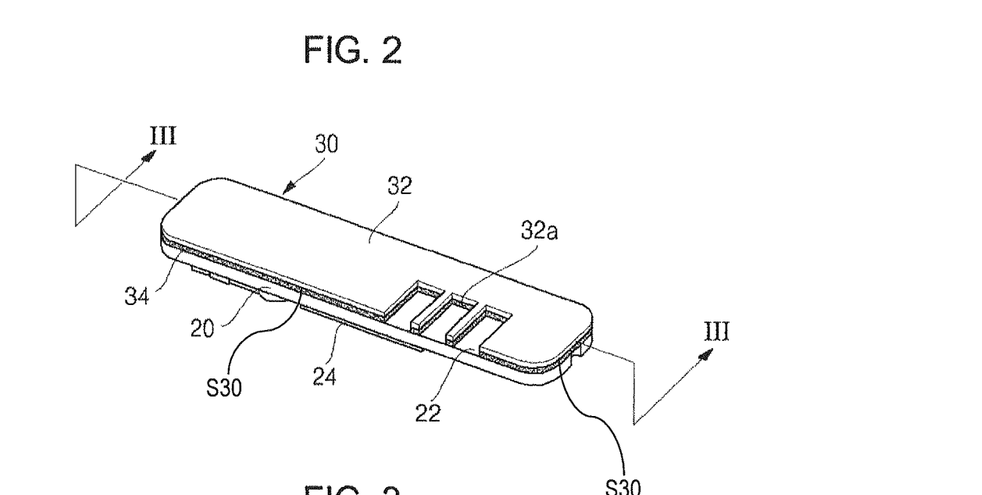
FIG. 2 is a side view illustrating a state that a protection circuit board and a board exterior cover are connected.
Figure 3:
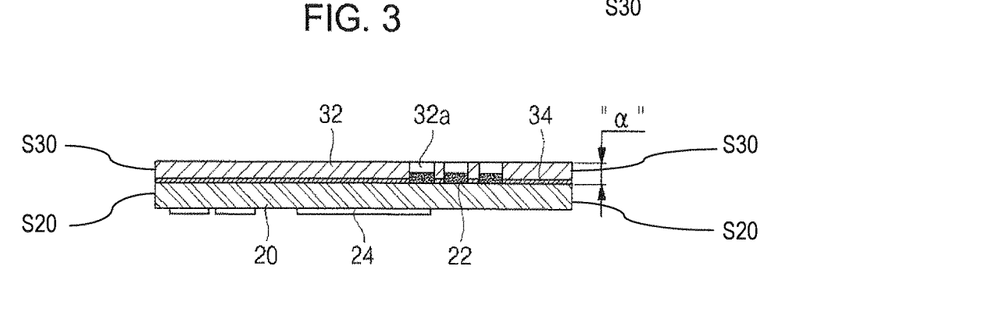
FIG. 3 is a cross-sectional view taken along line III-III of FIG. 2.

FIG. 1 is an exploded perspective view illustrating one exemplary embodiment of a protection circuit board and a board exterior cover of a secondary battery according to the present invention, FIG. is a side view illustrating a state that a protection circuit board and a board exterior cover are connected, FIG. 3 is a cross-sectional view taken along line III-III of FIG. 2. And, FIG. 4 is a perspective view illustrating a secondary battery of the core pack state in which a protection circuit board and a board exterior cover are applied according to FIGS. 1 through 3, and FIG. 5A and FIG. 5B are cross-sectional views illustrating a secondary battery that a molding resin member is formed on the core pack of 4 in accordance with different exemplary embodiments of the present invention.

Figure 4:
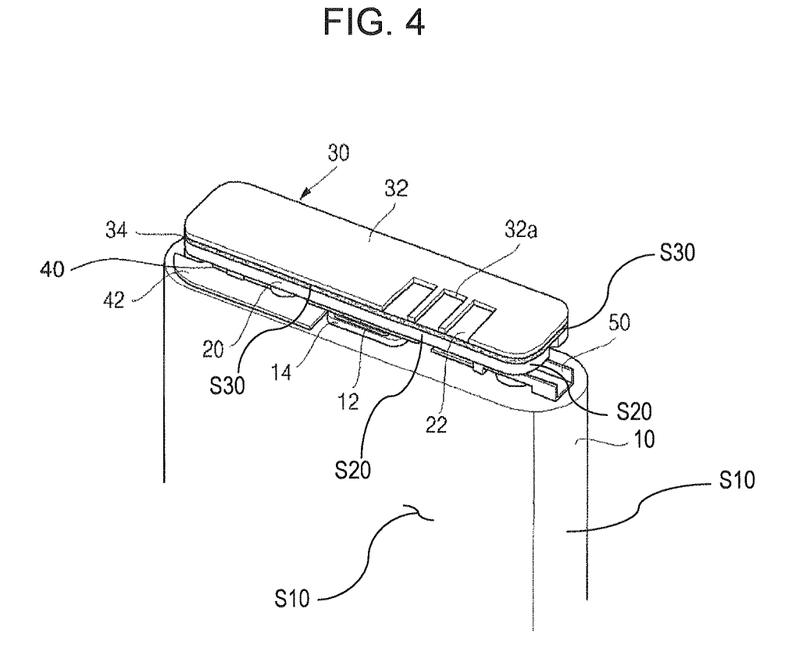
FIG. 4 is a perspective view illustrating a secondary battery of the core pack state in which a protection circuit board and a board exterior cover are applied.
Figure 5A:
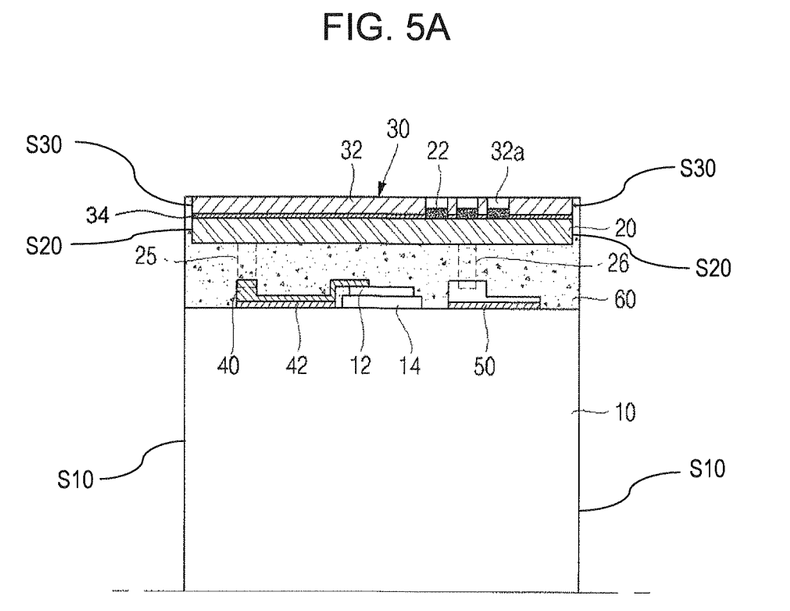
FIG. 5A is a cross-sectional view illustrating a secondary battery that a molding resin member is formed on the core pack of FIG. 4 in accordance with one exemplary embodiment of the present invention.
Figure 5B:
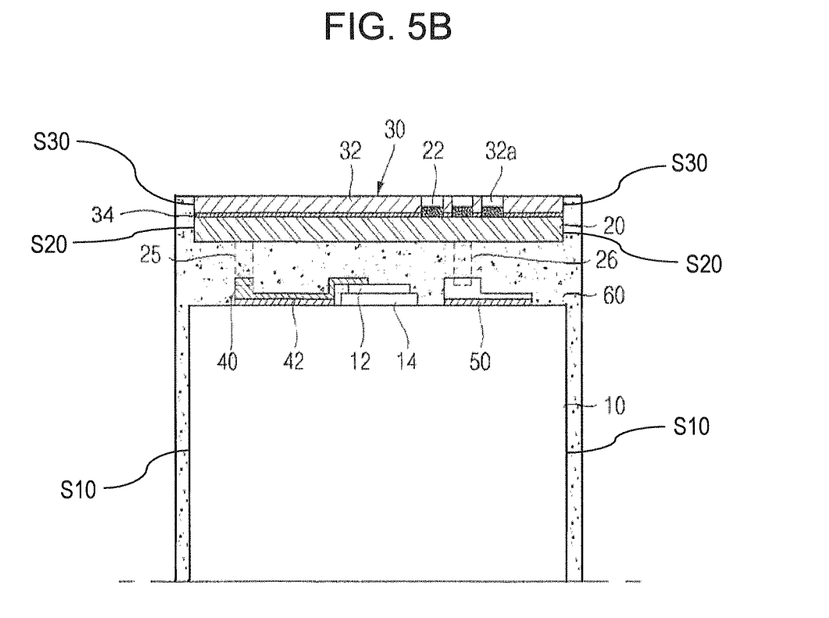
FIG. 5B is a cross-sectional view illustrating a secondary battery that a molding resin member is formed on the core pack of FIG. 4 in accordance with another exemplary embodiment of the present invention.

As illustrated in FIGS. 4, 5A and 5B, a secondary battery constructed as the principles of the present invention includes a rechargeable bare cell 10, a protection circuit board 20, a board exterior cover 30, a first and second lead plates 40 and 50, and a molding resin member 60.

Bare cell 10 is capable of being recharged and discharged, and an electrode terminal 12 is connected to one surface of the bare cell by an insulating gasket 14. The construction of bare cell 10 applied to a typical secondary battery is obvious to the one skilled in the art, therefore the detailed construction of bare cell 10 will not be shown on drawings and will be explained briefly.

Bare cell 10 is composed of a rectangular can having one open end, an electrode assembly accommodated in the can, a cap assembly sealing the open side of the can, an electrode terminal which is connected to a cap plate of the cap assembly with a state that an insulating gasket exists. The electrode assembly is wound with a state that a separator lies between a positive electrode plate and a negative electrode plate, and electrode taps are attached to the positive electrode and negative electrode plates, respectively. Here, one electrode tap attached the positive electrode plate is connected to the cap plate of the cap assembly thus the entire cap becomes a positive electrode terminal, and another electrode tap attached the negative electrode plate is connected to the electrode terminal of the cap plate thus the electrode terminal becomes a negative electrode terminal.

A protection circuit against bare cell 10 is formed in protection circuit board 20, an external terminal 22 is installed in one surface of protection circuit board 20. Protection circuit board 20 is generally configured that a multitude of electronic elements 24 are mounted on a printed circuit board (PCB).

Board exterior cover 30 is connected to one surface of protection circuit board 20, in other words, board exterior cover 30 is connected to the protection circuit board 20 with a state that external terminal 22 is exposed. Board exterior cover 30 serves as an exterior finishing material and a protection material of protection circuit board 20, and the structure of board exterior cover 30 will be explained with reference to FIGS. 1 through 3. The board exterior cover 30 includes side surfaces S30, and the protection circuit board 20 includes side surfaces S20.

As illustrated in the drawings, board exterior cover 30 may be composed of a cover body 32 and a bonding layer 34. Cover body 32 is made of a hard material, and thus cover body 32 protects protection circuit board 20 from external impacts. For example, cover body 32 may be made of a plastic material which has excellent insulating ability and moldability, and if cover body 32 is made of a hard plastic material, the external appearance of the secondary battery will become elegant because board exterior cover 30 may be fit in an exterior case.

Particularly, when cover body 32 is made of a plastic film manufactured by the extrusion molding technique, the manufactured plastic film may be made in the form of the ultra thin film having a thickness of 0.1 mm (i.e. 0.1 millimeter), or thin film having thickness of 0.35 mm or below, because of the characteristics of the extrusion molding capable of molding the molding resin member into a thin film. The cover body may be made of a material having thickness of 0.4 mm or above when cover body 32 is made by the extrusion molding same as the conventional injection molding. Therefore, cover body 32 in accordance with the present invention is made in the form of the thin film of 0.1 mm thickness, or thin film of 0.35 mm and below, or film having thickness of 0.4 mm or above, and this may be applied to one surface of protection circuit board 20 toward the external terminal.

Cover body 32 has a through hole 32a, so that external terminal 22 of protection circuit cover 20 is exposed when the cover body is connected to protection circuit cover 20.

Bonding layer 34 is formed on one surface of cover body 32, and bonding layer 34 bonds cover body 32 with one surface of the protection circuit board 20. Also, bonding layer 34 may be formed by a stripe having an adhesive on both sides or by coating the adhesive on one surface of cover body 32, and may be formed in any other forms to provide adhesive property.

The thickness of bonding layer 34 ranges between 0.05 and 0.1 mm, and bonding layer 34 formed in this thickness range can bond cover body 32 to protection circuit board 20 strongly. If the thickness of bonding layer 34 is more than 0.1 mm, the bonding layer does not provide sufficient adhesive force and the entire length of the secondary battery is increased and bonding layer 34 is extended to side surface S30 of board exterior cover 30 or protection circuit board 20 when it is bonded. Further, the present invention is not restricted to the value range of bonding layer 34.

Length of each side of board exterior cover 30 may be formed to have the same length of according side of the surface of protection circuit board 20, the surface of protection circuit board 20 is where external terminal 22 is exposed. Therefore, the connected side surface of board exterior cover 30 and protection circuit board 20 has a flat structure without any protruded part when they are connected to each other.

First and second lead plates 40 and 50 are connected to the positive electrode/negative electrode (not shown in drawings) and to protection circuit board 20, respectively, and first and second lead plates 40 and 50 are made of nickel, and the present invention is not restricted thereto.

The electrical connection structure between first and second lead plates 40 and 50 and bare cell 20 will be explained with respect to the exemplary embodiment of the present invention. Bare cell 10, as described before, has a structure that the can forming the exterior shape is connected to a positive electrode of the electrode assembly and forms one positive electrode terminal, and the electrode terminal connected to the cap plate via insulating gasket 14 is electrically connected to the negative electrode of the electrode assembly and forms one negative electrode terminal.

As illustrated in FIGS. 4, 5A and 5B, first lead plate 40 is connected to one surface of bare cell 10 with an insulating sear 42 interposed therebetween, with the one surface of the cap plate (hereinafter, it is referred to as "one surface of the bare cell") being connected to the electrode terminal 12 via the insulating gasket 14. Further, first lead plate 40 connected to electrode terminal 12 of bare cell 10 is connected to a first connection terminal 25 of protection circuit board 20, in other word, the negative electrode of bare cell 10 and protection circuit board 20 are electrically connected by first lead plate 40. The bare cell 10 includes side surfaces S10.

Second lead plate 50 is connected to one surface of bare cell 10 and thus it is electrically connected to the cap plate and the can forming the exterior shape of bare cell 10, and second lead plate 50 is connected to a second connection terminal 26 of protection circuit board 20, therefore the positive electrode of bare cell 10 and protection circuit board 20 are electrically connected by second lead plate 50.

Furthermore, first and second lead plates 40 and 50 have another functionality of bonding protection circuit board 20 to bare cell 10. The secondary battery in which protection circuit board 20 is connected to bare cell 10 as illustrated in FIG. 4 is referred as a core pack, and more specifically, as a rectangular core pack. The protection circuit board 20 is connected to bare cell 10 by first and second lead plates 40 and 50. Here, the connection state between bare cell 10 and protection circuit board 20 may be not firm enough and first and second lead plates 40 and 50 may need to be electrically insulated from each other. Thus it is not common for the secondary battery to be used as a state of the core pack. The secondary battery may be used in a state that the connection part connecting bare cell 10 and protection circuit board 20 is reinforced or electrically insulated by the molding resin member, or that the core pack is covered by the separate exterior case.

Here, there is no need to mold one surface of protection circuit board 20, in which board exterior cover 30 is attached, with the molding resin member, since the one surface with the external terminal 22 of protection circuit board 20 (hereinafter, it is referred to as "one surface of the external terminal side") is pre-protected and packed by board exterior cover 30. Therefore, as illustrated in FIGS. 5A and 5B, there is no need to mold the one surface which is exposed to the exterior of protection circuit board 20, since board exterior cover 30 is attached to the one surface, in which external terminal 22 is formed, of protection circuit board 20. As shown in FIG. 5A, in accordance with one embodiment of the present invention, the molding part 60 may be disposed in a space between the protection circuit board 20 and the bare cell 10, and cover the side surfaces S20 of the protection circuit board 20 and the side surfaces S30 of the board exterior cover 30. As shown in FIG. 5B, in accordance with another embodiment of the present invention, the molding part 60 may be disposed in a space between the protection circuit board 20 and the bare cell 10, cover the side surfaces S20 of the protection circuit board 20 and the side surfaces S30 of the board exterior cover 30, and cover a part of the side surfaces S10 of the bare cell 10.

Therefore, the entire volume of the molding region and the molding resin member used in the molding operation are reduced compared to the conventional molding which molds even the one surface of external terminal 22 of protection circuit board 20, thus the workability of the mold operation is improved because the structure of the mold frame is simplified and the operation injecting the molding resin member is relatively easier. One surface of protection circuit board 20 toward external terminal 22 of protection circuit board 20 is hard and is covered by thin board exterior cover 30, so it is strongly protected comparing to be protected by a thin molding surface, and the external appearance of the secondary battery is elegant because it is fit in the can made of a metal material. That is, the thickness a of board exterior cover 30 including bonding layer 34 is manufactured with the range of 0.15 mm to 0.4 mm depending on the battery size and the usage. The thickness of the board exterior cover including the bonding layer may be 0.45 mm or above.

Figure 6:
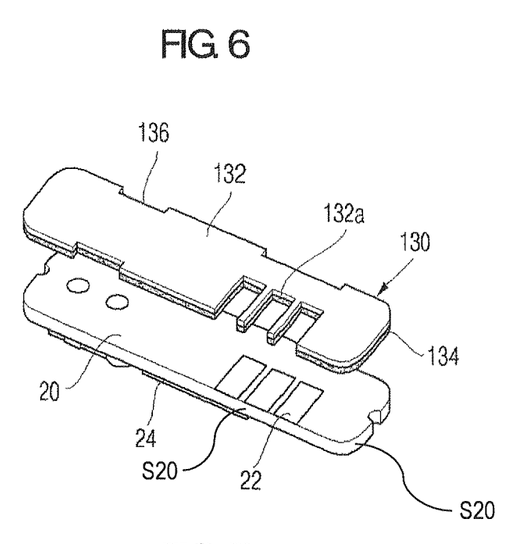
FIG. 6 is an exploded perspective view illustrating another exemplary embodiment of a protection circuit board and a board exterior cover of a secondary battery according to the present invention.
Figure 7:
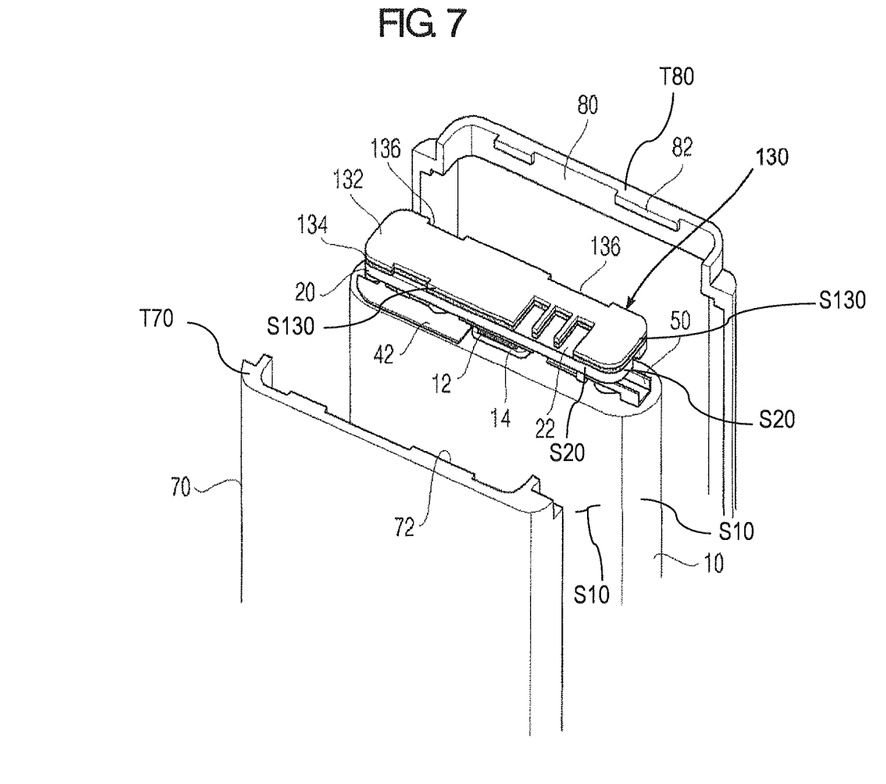
FIG. 7 is an exploded perspective view illustrating one exemplary embodiment of a secondary battery in which the protection circuit board and the board exterior cover according to the embodiment of FIG. 6 are applied.
Figure 8:
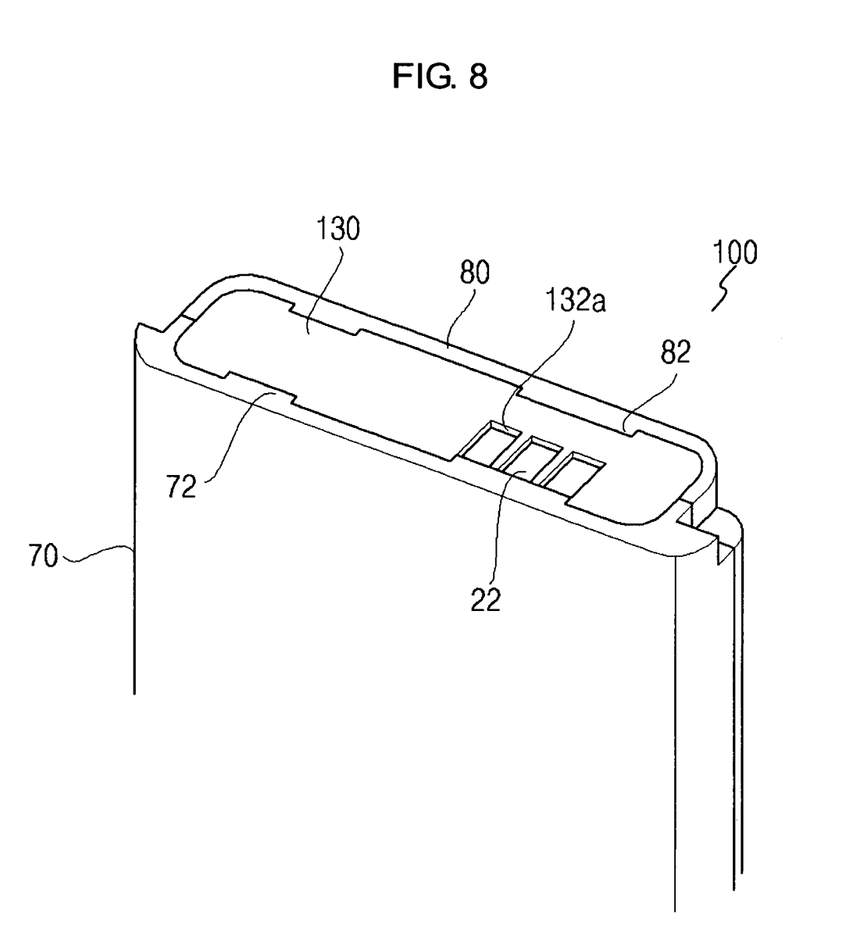
FIG. 8 is a perspective view illustrating the connection state of the secondary battery according to the embodiment of FIG. 7.

FIGS. 6 to 8 are views illustrating another embodiments of the board exterior cover against the protection circuit board according to the present invention and the secondary battery in which the board exterior cover of the another embodiment is applied. That is, FIG. 6 is an exploded perspective view illustrating another exemplary embodiment of a protection circuit board and a board exterior cover of a secondary battery according to the present invention, FIG. 7 is an exploded perspective view illustrating one exemplary embodiment of a secondary battery in which the protection circuit board and the board exterior cover according to the embodiment of FIG. 6 are applied, and FIG. 8 is a perspective view illustrating the connection state of the secondary battery according to the embodiment of FIG. 7.

As illustrated in FIG. 6, board exterior cover 130 according to the embodiment includes a hard insulating cover body 132 having a through hole 132a, a bonding layer 134 formed on one surface of the cover body 132 to bond the cover body 132 to one surface of protection circuit board 20, therefore board exterior cover 130 is similar to board exterior cover 30 according to the embodiments of FIGS. 1 to 5.

Furthermore, board exterior cover 130 according to the present embodiment has at least one pair of cutout portions 136 oppositely disposed on the perimeter. Cutout portions 136 are connected to exterior cases 70 and 80 of the secondary battery so called a hard pack type battery, and then securely attaches to board exterior cover 130 to protection circuit board 20. Therefore, it is preferable that a pair of cutout portions 136 is respectively formed on two long edges of board exterior cover 130. The present invention, however, is not restricted thereto.

Cutout portions 136 connect exterior case 70, 80 with protection circuit board 20, and fix exterior cases to protection circuit board 20. Therefore, if one cutout portion 136 is formed on two long edges respectively, protection circuit board 20 is not strongly connected to exterior case 70, 80 with sufficient binding force, and thus structural safety problem may occur. Also, if excessive number of cutout portions 136 are formed, the moldability of the board exterior cover 130 is reduced and the connection structure of the exterior case 70, 80 becomes complicated, thus the moldability of exterior cases 70, 80 is also reduced.

As described above, it is, therefore, preferable that the cutout portions 136 are formed on both sides of two long edges. Cutout portion 136 may have a configuration of penetrating board exterior cover 130 in thickness direction, therefore a step structure is formed in the contact region of board exterior cover 130 and protection circuit board 20 by cutout portions 136 when board exterior cover 130 is connected to protection circuit board 20. Cutout portion 136 may be configured not to penetrate board exterior cover 130 in thickness direction thus board exterior cover 130 itself may have a step structure, however board exterior cover 130 should have a relatively thicker thickness. Therefore, it is preferable that the cutout portion 136 is formed to penetrate board exterior cover 130 in thickness direction, and the step structure is formed on one surface of protection circuit board 20 toward external terminal 22 when board exterior cover 130 is connected to protection circuit board 20 by cutout portion 136.

The present invention will be explained with reference to FIGS. 7 and 8. FIGS. 7 and 8 illustrate the example that the secondary battery is completed as the core pack combining the bare cell and the protection circuit board is received in the exterior.

As illustrated in the drawings, exterior case referred to as the hard case is composed of a first exterior case 70 and a second exterior case 80, and first and second exterior cases 70, 80 surround a side surface of bare cell 10, a space between bare cell 10 and protection circuit board 20, and a side surface of protection circuit board 20 and a side surface of board exterior cover 130 thus are close off from outside.

First and second fixed protrusions 72, 82 which are to be inserted into cutout portion 136 of board exterior cover 130 are formed in the top ends T70 and T80 of first and second exterior cases 70, 80. That is, first and second exterior cases 70, 80 are connected to each other in a state that first and second fixed protrusions 72, 82 are inserted into cutout portions 136 of board exterior cover 130 respectively, thus a side surface of bare cell 10, a space between bare cell 10 and protection circuit board 20, and a side surface S20 of protection circuit board 20 and a side surface S130 of board exterior cover 130 are surrounded by first and second exterior cases 70, 80 connected to each other by cutout portions 136 and are close off from outside. Here, protection circuit board 20 is fixed in the state that the side surface of protection circuit board 130 is covered by first and second exterior cases 70, 80, since step structure formed in protection circuit board 20 by the cutout portion 136 of board exterior cover 130 is coupled by first and second fixed protrusions 72, 82.

In this way, one surface of protection circuit board 20 toward external terminal 22 is protected and packed by board exterior cover 130 in advance, therefore covering a case on one surface of protection circuit board 20 toward external terminal 22 is not necessary. Therefore, the amount of the material required for exterior cases 70, 80 is reduced and the structure of exterior cases 70, 80 and the manufacturing processes are simplified, because making an exterior case to cover side surfaces of protection circuit board 20 is simpler comparing to the conventional method which even molds the one surface of protection circuit board 20 toward external terminal 22. The board exterior cover may be made in the form of the ultra thin film having a thickness of 0.1 mm, or a thickness of 0.15 mm to 0.40 mm or a thickness of 0.45 by the extrusion molding, thus the entire length of the secondary battery can be reduced when the board exterior cover of this construction is applied.

When the core pack is cased by exterior cases 70, 80, the casing operation which cases the core pack with exterior cases 70, 80 can be easily done because the complicated process of exposing external terminal 22 of protection circuit board 20 can be omitted.

Further, the top end of first and second exterior cases 70, 80 is measured on the basis that a secondary battery 100 stands on the ground so as to position protection circuit board 20 at the upper part.

It is preferable that the top end of exterior cases 70, 80, and first and second fixed protrusions 72, 82 formed on the top end of exterior case 70, 80 are positioned at the same height as one surface of the board exterior cover exposed to the outside. That is, the top surface of secondary battery 100 having top ends of exterior cases 70, 80, fixed protrusions 72, 82 and one surface of board exterior cover 130 is a flat surface as first and second fixed protrusions 72, 82 and cutout portions 136 are formed at the same height, and the top surface of first and second fixed protrusions 72, 82 and top surface of exterior case 70, 80 are formed at the same height.

Further, a lower case which covers and blocks the bottom surface of the bare cell may be formed in the first and second exterior cases. The lower case which covers and blocks a part of the bottom surface of the bare cell may be formed in the first and second exterior cases, respectively and the lower cases may cover the bottom surface of the bare cell as the lower cases are connected to each other when the first and second exterior cases are connected.

Therefore, the structural safety of the secondary battery is increased because the bare cell is strongly protected by the exterior case and the lower part of the bare cell is supported by the lower case as the lower case formed in the exterior case covers the bottom surface of the bare cell.

The molding operation by the bare cell and the molding resin member of the protection circuit module and the hard pack operation by the exterior case are accomplished with ease in the secondary battery according to the present invention as explained in the exemplary embodiments.

According to the secondary battery which the bare cell and the protection circuit module are molded by the molding resin member, the structural safety of the secondary battery as well as the protection circuit board is increased because one surface of the protection circuit board exposed to the outside is relatively strongly protected.

The amount of the molding resin member used in the molding operation of the bare cell and the protection circuit board, or the volume of the exterior case used in the hard pack operation of the bare cell and the protection circuit board is reduced, thus the manufacturing costs of the secondary battery is reduced and the productivity is increased due to the simplification of the manufacturing processes.

The over-all length of the secondary battery may be decreased because the protection circuit board of the core pack can be formed in a thin thickness when the hard pack type battery is formed by covering the core pack with the exterior case.

What is claimed is:

1. A secondary battery, comprising:
    a rechargeable bare cell;
    a protection circuit board supporting a protection circuit electrically connected to the bare cell and an external terminal installed on one surface of the protection circuit board;
    a board exterior cover being adhered to the protection circuit board by a bonding layer, the board exterior cover exposing the external terminal, the board exterior cover comprising a pair of surfaces which are opposite to and spaced apart from each other and at least one lateral surface connecting the pair of surfaces, the peripheries of the pair of surfaces of the board exterior cover being geometrically identical to each other;
    the bonding layer adhering to an entirety of one of the pair of surfaces of the board exterior cover; and
    a first lead plate and a second lead plate which electrically connect the bare cell to the protection circuit board.

2. The secondary battery of claim 1, wherein the board exterior cover includes an insulating cover body through which the external terminal is exposed, and the bonding layer which is formed on an entirety of one major surface of the insulating cover body with the one major surface of the insulating cover body facing towards the protection circuit board.

3. The secondary battery of claim 2, wherein the insulating cover body is made of a hard plastic.

4. The secondary battery of claim 2, wherein the insulating cover body is formed of a plastic film manufactured by an extrusion molding.

5. The secondary battery of claim 4, wherein the thickness of the plastic film is in a range of 0.1 mm to 0.4 mm.

6. The secondary battery of claim 2, wherein the thickness of the bonding layer is in a range of 0.05 mm to 0.1 mm.

7. The secondary battery of claim 2, wherein the bonding layer is formed by a stripe having an adhesive on both sides.

8. The secondary battery of claim 2, wherein the bonding layer is formed by coating an adhesive on one surface of the insulating cover body.

9. The secondary battery of claim 1, wherein a molding resin member is formed within a space disposed between the protection circuit board and the bare cell and covers the at least one lateral surface of the board exterior cover.

10. The secondary battery of claim 9, wherein the molding resin member is formed to cover a part of side surfaces of the bare cell.

11. The secondary battery of claim 1, wherein at least one pair of cutout portion is formed at a periphery of the board exterior cover.

12. The secondary battery of claim 11, wherein two pairs of the cutout portions are formed at longer edges of top ends of the board exterior cover.

13. The secondary battery of claim 11, wherein the at least one pair of cutout portion penetrates the board exterior cover in a thickness direction.

14. The secondary battery of claim 11, further comprising:
a first exterior case, wherein a first fixed protrusion inserts into a first cutout portion of the board exterior cover and said first exterior case covers a part of side surfaces of the bare cell; and
a second exterior case, wherein a second fixed protrusion inserts into a second cutout portion of the board exterior cover and said second exterior case together with the first exterior case covers all of side surfaces of the bare cell.

15. The secondary battery of claim 14, wherein the top ends of the first exterior case, the second exterior case and the fixed protrusions may have same heights with one surface of the board exterior cover through which the external terminal is exposed.

16. The secondary battery of claim 1, wherein a length of each side of the board exterior cover is identical to a length of a corresponding side of the protection circuit board.

17. A secondary battery, comprising:
a bare cell which is rechargeable;
a protection circuit board supporting a protection circuit electrically connected to the bare cell and an external terminal installed on one surface of the protection circuit board, and said external terminal being exposed to an exterior of the battery via a through hole formed in an exterior cover for the protection circuit board;
the exterior cover being adhered to the protection circuit board by a bonding layer, the exterior cover comprising a pair of surfaces which are opposite to and spaced apart from each other and at least one lateral surface connecting the pair of surfaces the peripheries of the pair of surfaces of the exterior cover being geometrically identical to each other;
the bonding layer adhering to an entirety of one of the pair of surfaces of the exterior cover;
a first lead plate and a second lead plate electrically connecting the bare cell to the protection circuit board; and
a molding resin member formed between spaces between the protection circuit board and the bare cell and covering side surfaces of the protection circuit board and side surfaces of the exterior cover.

18. A secondary battery, comprising:
a bare cell which is rechargeable;
a protection circuit board supporting a protection circuit electrically connected to the bare cell and an external terminal installed on one surface of the protection circuit board, and said external terminal being exposed to an exterior of the battery via a through hole formed in a board exterior cover;
the board exterior cover being adhered to the protection circuit board by a bonding layer, the board exterior cover comprising a pair of surfaces which are opposite to and spaced apart from each other and at least one lateral surface connecting the pair of surfaces, the peripheries of the pair of surfaces of the board exterior cover being geometrically identical to each other;
the bonding layer adhering to an entirety of one of the pair of surfaces of the board exterior cover;
a first lead plate and a second lead plate electrically connecting the bare cell to the protection circuit board;
a molding resin member formed between spaces between the protection circuit board and the bare cell and covering side surfaces of the protection circuit board and side surfaces of the board exterior cover;
said board exterior cover having a plurality of cut portions formed at a periphery of said board exterior cover;
a first exterior case, in which a first fixed protrusion inserts into a first cutout portion of the board exterior cover and said first exterior case covers a part of a side surface of the bare cell; and
a second exterior case, in which a second fixed protrusion inserts into a second cutout portion of the board exterior cover and said second exterior case together with the first exterior case covers all of the side surfaces of the bare cell.

* * * * *